March 31, 1931.  W. S. RICHARDSON  1,798,223
AERIAL GRADE CLAMP
Filed July 3, 1930

Inventor
Warren Spencer Richardson
By Lester L. Sargent
Attorney

Patented Mar. 31, 1931

1,798,223

UNITED STATES PATENT OFFICE

WARREN SPENCER RICHARDSON, OF CHARLOTTE, NORTH CAROLINA, ASSIGNOR OF ONE-HALF TO FRANK L. RAY, OF MECKLENBURG COUNTY, NORTH CAROLINA

AERIAL GRADE CLAMP

Application filed July 3, 1930. Serial No. 465,737.

The object of my invention is to provide a novel aerial clamp for supporting telephone-telegraph cables; and to provide a novel combination of elements and to increase the efficiency in a device of this kind.

I attain these and other objects of my invention by the device illustrated in the accompanying drawings, in which—

Like numerals designate like parts in each of the several views.

Figure 1:
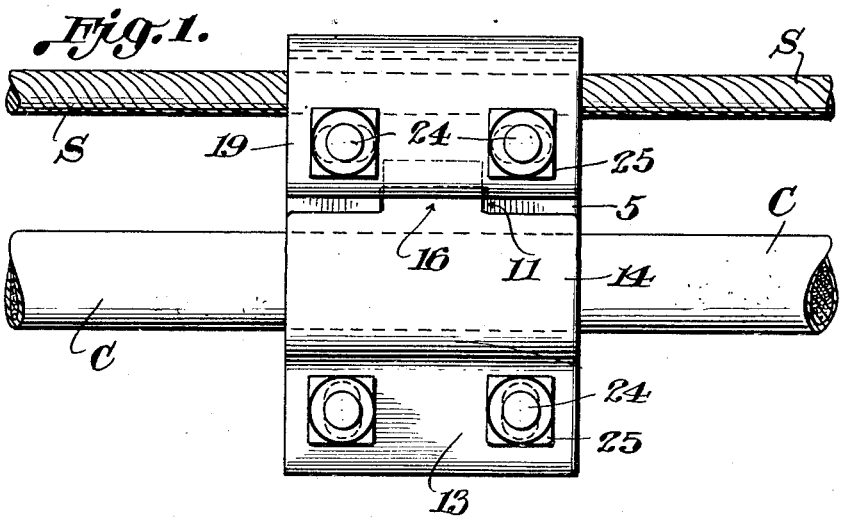
Figure 1 is a side elevation of my invention in use.

Referring to the accompanying drawings, I provide a plate 5 having a curved or semi-cylindrical portion 6 to receive a telegraph or telephone cable C. The plate 5 is provided with a rib 7 and a parallel groove 8 to receive a supporting cable S. 9 designates the upper edge of the plate. The lower portion of the plate is provided with vertical elongated bolt slots 12, and the upper portion of the plate is provided with elongated bolt slots 10 and a central opening 11.

Figure 2:
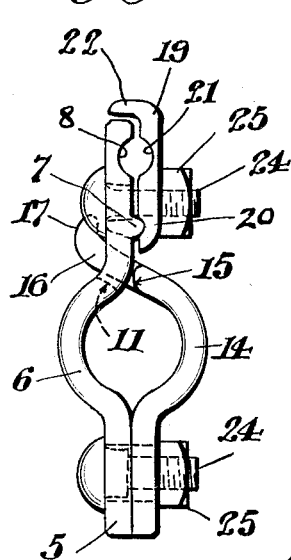
Fig. 2 is an end elevation of same.
Figure 3:
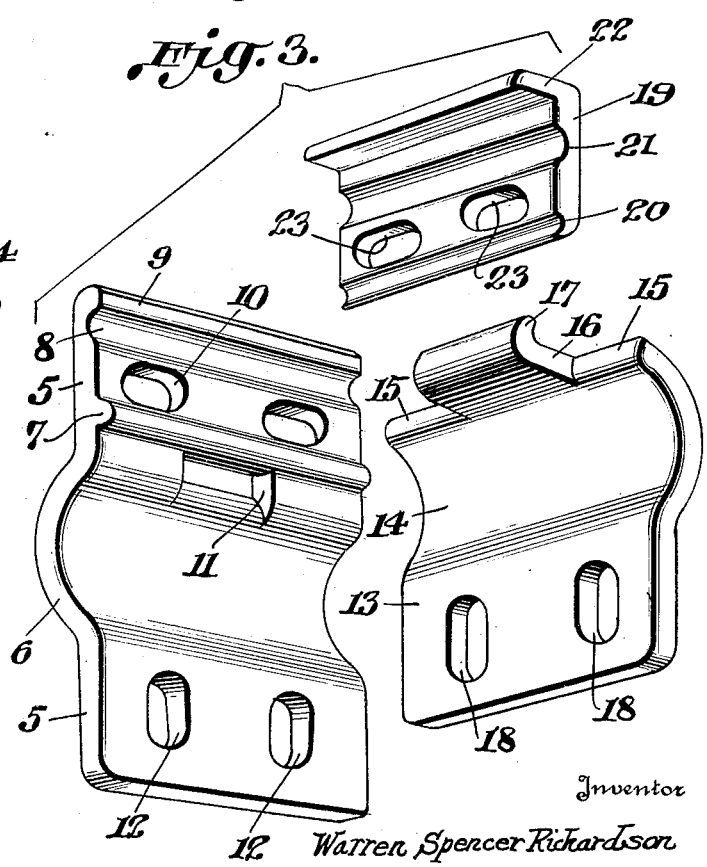
Fig. 3 is a perspective view of the several members of the device (except the bolts), detached and shown in perspective.

I provide an opposed plate 13 having a curved or semi-cylindrical portion 14 disposed opposite the portion 6 to engage around the telephone-telegraph cable C. I also provide a tongue 16 adapted to be inserted through the slot 11 of plate 5. Tongue 16 is provided with an upwardly turned end or edge portion 17, as shown in Fig. 3. 15 designates the edge portions of the plate 13 which abut against the opposed plate 5, as shown in Fig. 2. I also provide vertical elongated slots 18 in the lower portion of plate 13.

I provide an upper plate member 19 having a groove 20 suitably positioned to receive the rib 7 of plate 5. I also provide a groove 21 suitably positioned to oppose the corresponding groove 8 in plate 5 and to receive the supporting cable S. I also provide a top flange or cover member 22 disposed at right angles to the bottom of the plate 19. I also provide elongated slots 23 corresponding in position with the slots 10 of plate 5. I also provide suitable short bolts 24 and nuts 25 to fasten plate 19 to plate 5, and plate 13 to plate 5, as shown in Figs. 1 and 2.

The operation of the device will be obvious from an examination of Figs. 1 and 2 of the drawings. The curved portions 6 and 14 of plates 5 and 13 function to support the telephone or telegraph cable C, tongue 16 of the plate 13 being inserted through the slot 11 of plate 5, and the plates being adjustably bolted together by reason of the elongated shape of the slots 12 and 18. The plate 19 is similarly bolted to the upper portion of plate 5 and the grooves 8 and 21 cooperate to hold the supporting cable S. The rib 7 seats in the groove 20, as shown in Fig. 2, and the flange 22 overlaps the edge 9 of main plate 5.

It is of course within the contemplation of my invention to make the cable clamp of any suitable size and of any suitable material, preferably of suitable iron material.

A difficulty with clamps heretofore devised is that when the bolts are tightened enough to hold the messenger cable, it also tightens to the same degree the part of the clamp holding the lead cable. This causes a pressure that injures and flattens the telephone or telegraph cable, which consists of a number of small wires covered with soft lead. Only a slight pressure on the lead cable would injure it.

My device permits of independent adjustment of the portion of the clamp engaging the supporting cable and the portion of the clamp engaging the telephone cable. This results in an important improvement.

What I claim is:

1. In an aerial grade clamp, the combination of a main plate having a curved portion to receive a telephone-telegraph cable, and having a groove to receive a supporting cable, and having a slot to receive a tongue member, an opposed lower clamp plate having a curved portion adapted to engage the telephone-telegraph cable and having a tongue insertable through the slot in the main plate, and a third plate having a groove to receive the supporting cable and having a cover element extending past the upper edge portion of the main plate, each of the aforesaid elements having opposed slots for fastening members, and adjustable fastening members.

2. In an aerial grade clamp, the combination of a main plate having a curved portion to receive a telephone-telegraph cable, and having a groove to receive a supporting cable, and having a slot to receive a tongue member, an opposed lower clamp plate having a curved portion adapted to engage the telephone-telegraph cable having a tongue insertable through the slot in the main plate, and a third plate having a groove to receive the supporting cable and having a cover element extending past the upper edge portion of the main plate, each of the aforesaid elements having opposed elongated slots for fastening members, and adjustable fastening members.

3. In an aerial grade clamp, the combination of a main plate having a curved portion to receive a telephone-telegraph cable, and having a groove to receive a supporting cable, and having a slot to receive a tongue member, an opposed lower clamp plate having a curved portion adapted to engage the telephone-telegraph cable and having a tongue insertable through the slot in the main plate, said tongue having an upwardly turned end portion, and a third plate having a groove to receive the supporting cable and having a cover element extending past the upper edge portion of the main plate, each of the aforesaid elements having opposed elongated slots for fastening members, and adjustable fastening members.

4. In an aerial grade clamp, the combination of a main plate having a curved portion to receive a telephone-telegraph cable, and having a groove to receive a supporting cable, and having a slot to receive a tongue member, the main plate having a rib disposed above the aforesaid slot and parallel with the groove for the supporting cable, an opposed lower clamp plate having a curved portion adapted to engage the telephone-telegraph cable and having a tongue insertable through the slot in the main plate, and a third plate having a groove to receive the supporting cable, and having a groove parallel with the groove for receiving the supporting cable, said groove being disposed opposite the rib of the main plate to receive same, each of the aforesaid elements having opposed elongated slots for fastening members, and adjustable fastening members.

5. In an aerial grade clamp, the combination of a main plate having a curved portion to receive a telephone-telegraph cable, and having a groove to receive a supporting cable, and having a slot to receive a tongue member, the main plate having a rib disposed above the aforesaid slot and parallel with the groove for the supporting cable, an opposed lower clamp plate having a curved portion adapted to engage the telephone-telegraph cable and having a tongue insertable through the slot in the main plate, and a third plate having a groove to receive the supporting cable, and having a groove parallel with the groove for receiving the supporting cable, said groove being disposed opposite the rib of the main plate to receive same, a cover element extending past the upper edge portion of the main plate, each of the aforesaid elements having opposed elongated slots for fastening members, and adjustable fastening members.

WARREN SPENCER RICHARDSON.